June 30, 1953          G. H. SILVA          2,643,477

FISH CATCHING APPARATUS

Filed July 2, 1948

INVENTOR.
GUY H. SILVA

BY
*Wm. H. Dean*
AGENT

Patented June 30, 1953

2,643,477

UNITED STATES PATENT OFFICE 2,643,477

FISH CATCHING APPARATUS

Guy H. Silva, San Diego, Calif.

Application July 2, 1948, Serial No. 36,627

6 Claims. (Cl. 43—6.5)

My invention relates to a fish catching apparatus, more particularly for use in handling large fish when elevating the same from the water's surface and into the boat, and the objects of my invention are:

First, to provide a fish catching apparatus of this class which greatly increases the fish catching capacity of a fisherman who must elevate fish caught over the side of the boat;

Second, to provide a fish catching apparatus of this class which permits one man to take the place of two or three men in the handling of large fish when elevating the same from the water into the boat;

Third, to provide a fish catching apparatus of this class which is very fast in operation and elevates a fish, then automatically pays out the line for catching another fish, all of which is accomplished by a single-cycle initiating switch, which is pressed each time a fish is on the line and ready for elevation into the boat;

Fourth, to provide a fish catching apparatus of this class in which the operator of the fish pole is only required to guide the pole and sustain a compression load equal to the weight of the fish;

Fifth, to provide a fish catching apparatus of this class in which a power-operated drum having a cable thereon is positioned above the elevation of the fisherman, so that the cable is extended substantially above the operator and connected to the end of the operator's fishing pole, providing for the vertical component of force required in lifting a heavy fish out of the water by the pole;

Sixth, to provide a fish catching apparatus of this class which greatly increases the capacity of a boat in the catching of fish due to the limited amount of space used by my fish catching apparatus and the operator thereof, whereby a greater number of fishermen may operate individually in the catching of large fish, so that a greater number of fish may be caught by a boat of a given size in a certain length of time; and Seventh, to provide a fish catching apparatus of this class which is very simple and economical in construction, and which will not readily deteriorate or get out of order.

Figure 1:
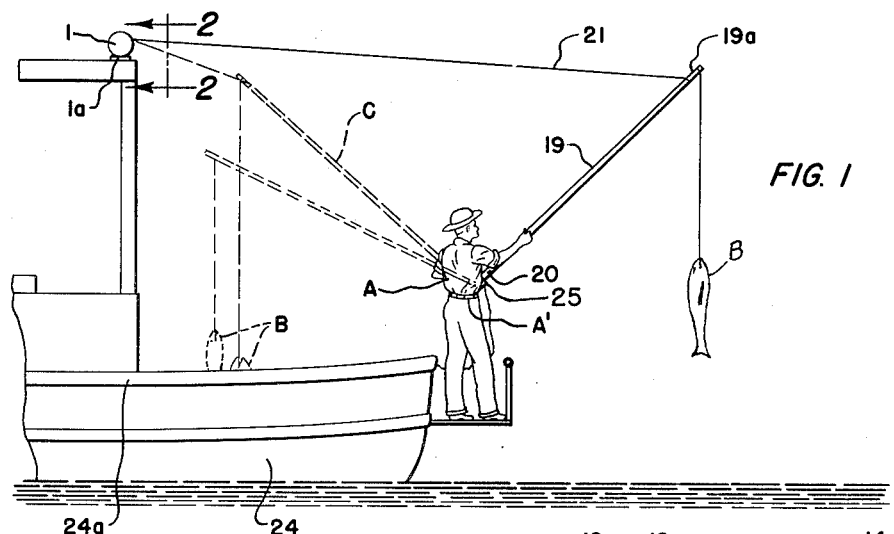
Figure 2:
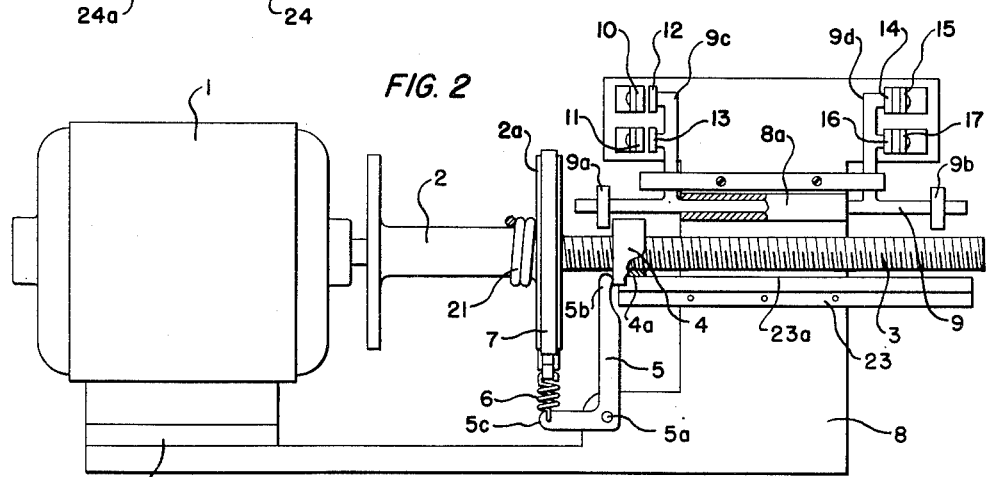
Figure 3:
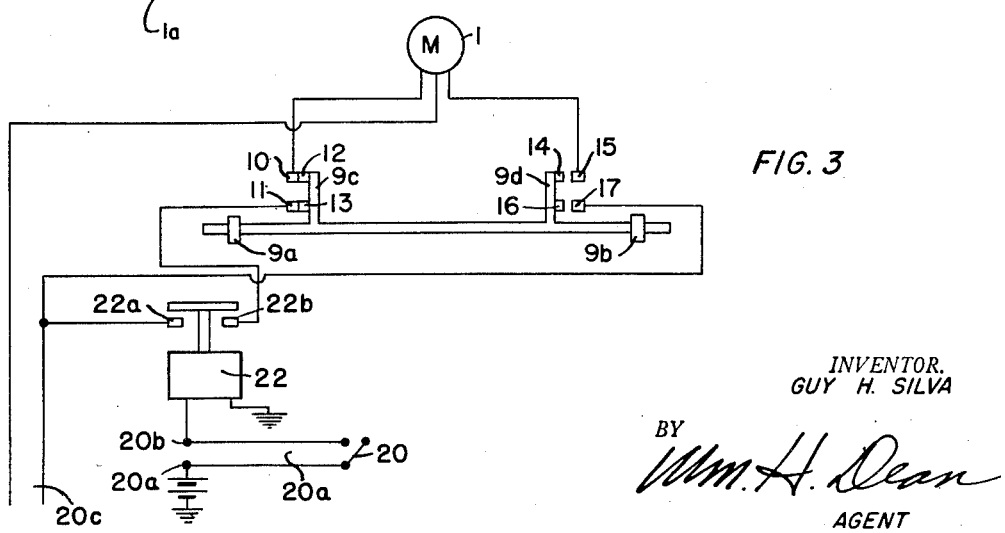

With these and other objects in view as will appear hereinafter, my invention consists of certain novel features of construction, combination, and arrangement of parts and portions as will be hereinafter described in detail and particularly set forth in the appended claims, reference being had to the accompanying drawings and to the characters of reference thereon forming a part of this application in which:

Fig. 1 is a side elevational view of my fish catching apparatus shown in connection with a fishing boat and illustrating the operator of the apparatus in the act of catching a large fish, Fig. 2 is an enlarged side elevational view of the motorized equipment of my fish catching apparatus taken from the line 2—2 of Fig. 1, showing portions broken away and in section to amplify the illustration, and Fig. 3 is a diagrammatic view of the electrical wiring used in connection with my fish catching apparatus.

Similar characters of reference refer to similar parts and portions throughout the several views of the drawings.

The motor 1, the drum 2, shaft 3, nut 4, lever 5, and spring 6, clutch 7, bracket 8, switch arm 9, contacts 10, 11, 12, 13, 14, 15, 16, and 17, line 18, fishpole 19, switch 20, cable 21, relay 22, nut guide rail 23, and the boat 24 constitutes the principal parts and portions of my fish catching apparatus.

The motor 1 is a reversible electric motor having a base 1a mounted substantially above the side rail 24a of the boat 24. This motor, as shown in Fig. 1 of the drawings, may be positioned on the top of a deckhouse or any other suitable spot which is considerably above the overall elevation of the operator A of the fishpole 19. The bracket 8, made of electrical insulating material, is rigidly supported relatively to the motor 1, as shown in Fig. 2 of the drawings. Fixed on this bracket 8 is a nut guide rail 23 having an edge portion 23a extending into a slotted portion 4a of the nut 4 which permits the nut 4 to traverse the rail 23 longitudinally thereof, but prevents the nut 4 from rotating about the axis of the screw shaft 3. Reciprocally mounted in the bearing portion 8a of the bracket 8 is the switch arm 9. This switch arm 9 is an electrical conductor and is provided with stop portions 9a and 9b made from material which is an electrical insulator near opposite ends thereof engageable with the nut 4 and is also provided with laterally disposed switch contact supports 9c and 9d. These portions 9c and 9d carry contacts 12 and 13 and 14 and 16 respectively, which are adapted to bridge the contacts 10 and 11 and 15 and 17, respectively. The shaft 3 is externally screw threaded in the internally screw-threaded bore of the nut 4 and this shaft 3 is rigidly connected with the drum 2 on which the cable 21 is wound. The clutch 7 is a band-type clutch extending around one end flange 2a of the drum 2, and connected to this band clutch 7 is a spring 6 which is a tension spring actuated by the bell crank lever 5 when engaged by the nut 4 traversing the shaft 3 longitudinally thereof. The extending end of the cable 21 is secured to the fish pole 19 near its outer end 19a at which location the fishing line 18 is connected to said fishing pole 19. Referring to the diagrammatic view of the wiring in Fig. 3 of the drawings, it will be seen that the switch 20 is a low-voltage switch adapted to actuate the relay 22 for connecting high voltage current supply to the motor 1 as shown in Fig. 3 of the drawings. The switch 20, as shown in Fig. 1 of the drawings, is placed on the handle portion of the pole 19 and the butt end of the fishing pole 19 is supported in a conventional belt socket 25, not shown, which constitutes a pivot means on the belt A' worn by the operator A, which belt socket 25 is a conventional type socket commonly employed by surf fishermen or others equipped to catch heavy fish.

The operation of my fish catching apparatus is substantially as follows:

When the operator A hooks a fish on the end of the line 18 and desires to raise the same into the boat 24, the normally open switch 20 mounted on the fish pole 19 is manually closed, which causes current to flow through the coil of the relay 22 which in turn conducts current for the motor from cable 20c through the contacts 22a and 22b thereof to the closed contacts 10, 12 and 11 and 13, which, in turn, closes the circuit to the armature of the motor 1, causing the armature to rotate in the direction for winding the cable 21 on the drum 2, the opposite end of the cable 21 being connected to the tip 19a of the pole 19, and when the cable 21 is wound on the drum 2, it forces the tip 19a of the pole 19 toward the drum to raise the fish B from the water and causes the fish pole 19 to pivot about its butt end which is supported in the conventional belt socket 25, not shown, which belt socket 25 is supported by the operator A as hereinbefore described. Thus the operator A is only required to provide guidance for the pole 19 and bear the compressive load exerted by the weight of the fish B as the pole at its tip end 19a travels upwardly and backwardly in an arc to the dash line position C as shown in Fig. 1 of the drawings. During the winding of the cable 21 on the drum 2 the nut 4 travels away from the brake lever 5 and the stop 9a on the arm 9. The nut 4 travels in this direction along the threaded shaft 3 causing the lever 5 to be released and which automatically releases the clutch 7. The nut travels until it reaches the stop 9b on the switch arm 9, forcing said switch arm 9 to open the contacts 10 and 12 and 11 and 13 and to close the contacts 14, 15, 16 and 17. The current then flows through the contacts 14, 15, 16 and 17 through the armature of the motor in a reverse direction, this causes the armature to start the drum 2 to rotate in the direction for unwinding the cable 21 from the drum 2 which drops the fish onto the deck of the boat. At this time, the switch 20 is normally released to its normally open position. During the unwinding of the cable from the drum 2, the nut 4 is forced backwardly along the threaded shaft 3 to the stop 9a and the brake lever 5 which causes the switch arm 9 to open the contact 14, 15, 16 and 17 which stops the current from flowing to the armature of the motor through said contacts 14, 15, 16 and 17. The stopping of the drum 2 is aided by the clutch 7 which is actuated in connection with the spring 6 and lever 5 when the nut 4 contacts the lever 5. As the nut 4 contacts the lever 5, the contacts 10, 12, 11 and 13 are closed which completes the cycle of operation wherein the cable 21 is all unwound from the drum 2 and all operating parts are at rest with the switch 20 in open position so that the fisherman may cast the fishing line 18 outwardly and flex the cable 21 into the solid line position as shown in Fig. 1 of the drawings. A new cycle of operations may then be initiated by manually pressing the normally open switch on the pole 19 for hoisting another fish into the boat 24.

The electrical cable 20a connected to the switch 20 extends from the fishing pole 19 to the terminals 20b and 20c which are mounted on the boat 24 and shown only in Fig. 3 of the drawings.

It will be here noted that the clutch 7 aids the stopping of the motor 1 after the contacts 14, 15, 16 and 17 have been opened preventing inertia of the motor 1 from jamming the nut 4 against the stop 9a as shown in Figure 2 of the drawings. The clutch 7 only operates as an aid in slowing down and stopping the motor 1 and the drum 2 after the motor 1 has been electrically de-energized by opening of the contacts 14, 15, 16 and 17.

In fishing for large fish, such as tuna or the like, it is common practice to connect several fishing poles together to a common line so that several men may be employed to hoist a single fish into the boat at one time. This arrangement of fishermen takes considerable space and in accordance with the conventional fishing operations the fishermen become very tired during the catching of fish in a school where the fish are large. In the employment of my fish catching apparatus one man may catch as many large fish as several men employing the old method of hoisting the large fish into the boat. Thus, it is obvious that several of my fish catching devices could be used for greatly increasing the fish catching capacity of a boat of a given size.

Though I have shown and described a particular construction, combination, and arrangement of parts and portions, I do not wish to be limited to this particular construction, combination, and arrangement, but desire to include in the scope of my invention the construction, combination, and arrangement substantially as set forth in the appended claims.

Having thus described my invention, what I claim as new and desire to secure by Letters Patent is:

1. In a fish catching apparatus, a boat, a drum revolubly mounted in elevated position on said boat having a cable wound thereon, a motor for operating said drum, said cable extending from said drum and in elevated position relatively to the deck of said boat, a fishing pole adapted to be manually operated having its outwardly extending end connected with said cable, a fishing line on said pole for catching fish thereon, switch means on said pole for controlling said motor and supporting socket means adapted to be mounted on an operator for supporting the opposite end of said pole.

2. In a fish catching apparatus, a boat, a drum revolubly mounted in elevated position on said boat having a cable wound thereon, a motor for operating said drum, said cable extending from said drum and in elevated position relatively to the deck of said boat, a fishing pole adapted to be manually operated having its outwardly extending end connected with said cable, a fishing line on said pole for catching fish thereon, switch means on said pole for controlling said motor, and socket means adapted to engage the butt end of said pole, said socket means being adapted to be supported by the operator of said fishing pole.

3. A boat, a fish catching apparatus on said boat comprising a motor, a drum revolubly operated by said motor, a cable on said drum, said drum being mounted in an elevated position on said boat, a fishing pole having an elevated end to which said cable is connected, a pivotal support for the butt end of said fishing pole arranged to be supported by the operator of said fishing pole, and switch means for controlling said motor for retracting said cable and pivoting the outer end of said fishing pole upwardly and backwardly toward said boat.

4. In a fish catching apparatus a boat, a motor on said boat, a drum operated by said motor and positioned on said boat, a cable in connection with said drum extending in an elevated position relatively to said boat, a fishing pole having a line thereon for catching fish and connected at its extending end with said cable, a pivotal support carried by the fisherman for the butt end of said pole, switch means for initiating operation of said motor, a threaded shaft in connection with said drum, a traversing nut on said threaded shaft, and a reversing switch operated by said nut for reversing the direction of rotation of said motor and said drum.

5. In a fish catching apparatus a boat, a motor on said boat, a drum operated by said motor and positioned on said boat, a cable in connection with said drum extending in an elevated position relatively to said boat, a fishing pole having a line thereon for catching fish and connected at its extending end with said cable, a cup mounted on a fisherman's belt for supporting the butt end of said pole, switch means for initiating operation of said motor, a threaded shaft in connection with said drum, a traversing nut on said threaded shaft, a reversing switch operated by said nut for reversing the direction of rotation of said motor and said drum, and a brake in connection with said drum actuated by said nut.

6. In a fish catching apparatus a boat, a motor on said boat, a drum operated by said motor and positioned on said boat, a cable in connection with said drum extending in an elevated position relatively to said boat, a fishing pole having a line thereon for catching fish and connected at its extending end with said cable, means carried by the fisherman for supporting the butt end of said pole, switch means for initiating operation of said motor, a threaded shaft in connection with said drum, a traversing nut on said threaded shaft, reversing switch means operated by said nut for reversing the direction of rotation of said motor and said drum, a brake in connection with said drum actuated by said nut, and an arm for supporting said reversing switches having stop means near opposite ends of said threaded shaft engageable with said nut whereby longitudinal movement of said arm relatively to said threaded shaft causes the opening of some of said switch means and the closing of other portions of said switch means for reversing operation of said motor.

GUY H. SILVA.

References Cited in the file of this patent

UNITED STATES PATENTS

| Number | Name | Date |
|---|---|---|
| 132,442 | Clarke | Oct. 22, 1872 |
| 1,720,714 | Bergesen | July 16, 1929 |
| 1,794,961 | James | Mar. 3, 1931 |
| 1,855,892 | Schiebeler | Apr. 26, 1932 |
| 2,051,388 | Nickles | Aug. 18, 1936 |
| 2,548,038 | Moliskey | Apr. 10, 1951 |

FOREIGN PATENTS

| Number | Country | Date |
|---|---|---|
| 525,082 | France | Apr. 7, 1920 |